June 19, 1951  D. H. CHASON  2,557,259
TREADLE BEARING
Filed Dec. 8, 1945
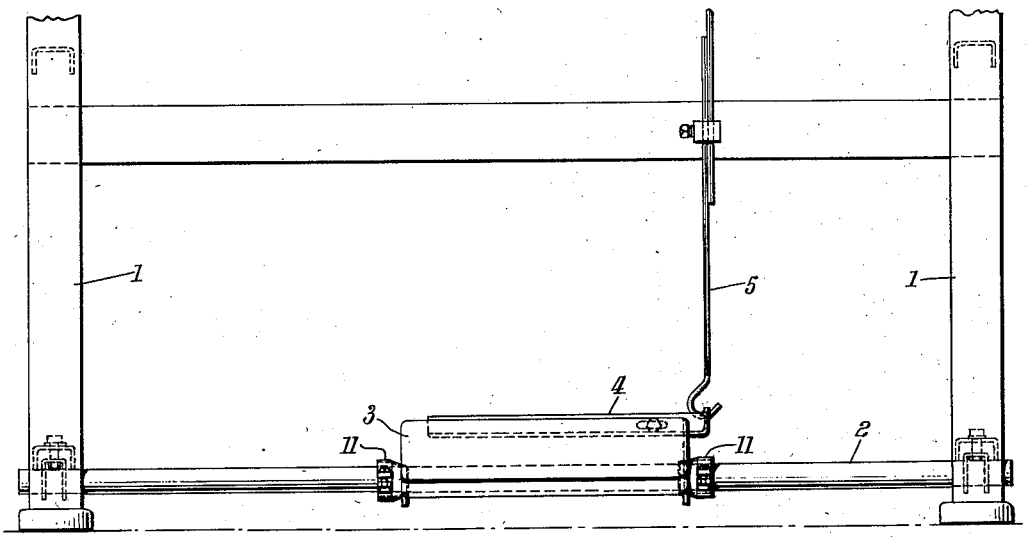
Fig. 1.
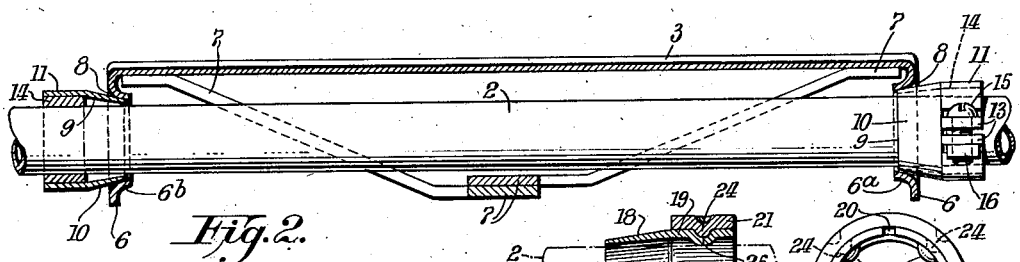
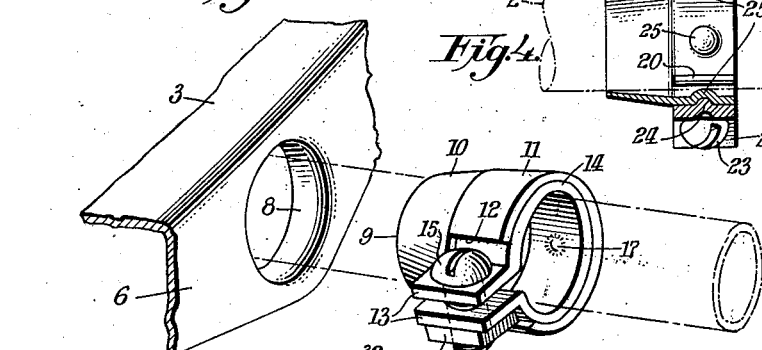
Inventor
Daniel H. Chason
By
William P. Stewart
Attorney Patented June 19, 1951

2,557,259

UNITED STATES PATENT OFFICE 2,557,259

TREADLE BEARING

Daniel H. Chason, Elizabeth, N. J., assignor to The Singer Manufacturing Company, Elizabeth, N. J., a corporation of New Jersey Application December 8, 1945, Serial No. 633,639

3 Claims. (Cl. 308—70)

This invention relates to treadle bearings and more particularly to bearings for that type of treadle or foot-plate used with sewing machines and similar equipment. The present invention may be used on a foot-powered machine in which case the treadle or foot-plate may be connected to a belt wheel by the usual pitman-rod, or it may be used on a power-driven sewing machine as a foot-control treadle for the power source, etc.

The primary object of the invention is to provide an inexpensive treadle-bearing, which although made of light materials is strong and rigid and will be noiseless when in use.

The invention, both in structure and in operation, as well as additional objects thereof, will be best understood from the following description taken in conjunction with the accompanying drawings in which:

Fig. 1 is a front elevation of a portion of a sewing machine stand and to which one form of my invention is applied.

Fig. 2 is an enlarged longitudinal section of the treadle or foot-plate mounted upon a supporting member or bearing tube.

Fig. 3 is an enlarged fragmentary perspective view of a portion of the downturned marginal flange of the treadle or foot-plate with the conical bearing opening and of the cone-shaped bearing collar shown detached from said flange.

Figs. 4 and 5 are, respectively, a longitudinal and an end elevation of a modified form of bearing.

Figs. 6 and 7 are, respectively, a longitudinal section and an end elevation of another modified form of bearing.

Referring more particularly to the drawings, the invention is disclosed in connection with a sewing machine stand such as shown in my prior Patent No. 2,279,587, dated April 14, 1942, comprising the legs I between the lower ends of which is secured a supporting member 2, which may be in the form of a tube and upon which the foot-plate 3 is rockably mounted. This foot-plate is preferably constructed in accordance with the disclosure in my aforesaid patent. On the rear edge portion of the foot-plate is secured an extension 4 apertured to receive the hooked end of a rod 5 which may be connected with a clutch controlling arm of a power transmitter such as is shown in my prior patent aforesaid.

The foot-plate 3 is of inverted pan-like construction having a downturned marginal flange 6 extending thereabout. The foot-plate 3 is preferably provided with crossed truss-bars 7 spot-welded to the foot-plate 3 and spot-welded together at their crossing point.

In the present construction, opposed portions, $6^a$ and $6^b$, of the downturned marginal flange 6 of the foot-plate 3 are each provided with an inwardly tapered conical bearing seat or opening 8 entered in foot-plate supporting relation by a hollow bearing element or collar adjustably slidable upon the supporting member or tube 2.

Referring first to the construction illustrated in Figs. 1, 2 and 3, the opposed bearing elements or collars 9 each comprises a smooth reduced cone-shaped portion 10, adapted to enter the bearing opening 8, and a cylindrical split portion 11 forming a slot 12 affording clearance for outwardly directed ears 13 extending through the slot 12 from a split clamp-member 14 secured to and disposed within the cylindrical portion 11 of the collar. The ears 13 are perforated to receive a screw bolt 15 fitted with a nut 16 for constricting the member 14, thereby to clamp it and the collar 9 upon the supporting member 2.

In order to secure the bearing element 9 and split clamp-member 14 in interfitting relation and so as to be restrained against relative turning movement, they are preferably spot-welded together at a point 17 diametrically opposite and therefore remote from the slot 12.

Each of the opposed bearing devices above described comprises a unit construction which may be conveniently adjusted upon the supporting member 2 in proper relation to the foot-plate to provide for freedom of pivotal movement of the foot-plate and, nevertheless, to eliminate lost motion which would occasion objectionable noise.

In the modified form of construction illustrated in Figs. 4 and 5 of the drawings, a hollow bearing-element likewise has a portion provided with a smooth conical outer face 18 and an integral adjacent cylindrical portion 19 which is circumferentially interrupted by a narrow slit 20, whereby the cylindrical portion of the bearing-element may be constricted.

Embracing the cylindrical portion 19 of the bearing-element is a split strap or clamp-member 21 having opposed apertured ears 22 entered by a clamping bolt 23 provided with a nut 23'. The clamp-member 21 is indented at circumferentially spaced intervals to form inwardly extending nubs 24 adapted to enter correspondingly located indentations 25 formed in the cylindrical portion 19 of the bearing element, thereby to maintain bearing-element and clamp-member in interfitting relation. By tightening the clamp-member 21, the bearing-element may be clamped in properly adjusted position upon the support 2.

In another modified form of construction illustrated in Figs. 6 and 7 of the drawings, the hollow bearing-member is formed from a single blank stamped from a piece of sheet-metal of the desired thickness; the blank being then bent into the form shown. This modified bearing-member has the characteristic features comprising a smooth cone-shaped portion 26 and an adjacent generally cylindrical clamp-portion 27 having laterally extending ears 28 which are suitably apertured to receive a clamping bolt 29 provided with a nut 30.

In forming the cone-shaped portion 26, the edges of the blank are left slightly separated to provide a slit 31, whereby the cone may yield to provide a better fit in the bearing-opening 8 and to be fitted upon the supporting member 2 upon which the bearing-member is secured by tightening the bolt of the clamp-portion 27.

The shoulder 32 connecting the base of the cone portion 26 with the clamp-portion 27 is partly cut away circumferentially of the bearing-member at opposite sides of the ears 28 and, preferably, slightly more than half way about the member, to provide a slot 33 and a joining shoulder extending only from *a* to *b*. This construction affords the necessary flexibility for the clamping-portion 27 without effecting distortion of the cone-shaped portion 26 when tightening the clamping portion.

From the foregoing it will be understood that my invention provides an inexpensive treadle-bearing of light material and one that will be noiseless when in use.

Having thus set forth the nature of the invention, what I claim herein is:

1. Bearing means constructed and arranged to mount pivotally, on a shaft-like support, an angularly movable member having a bearing seat, including a bearing element comprising a hollow seat-engaging shell having the shape of a truncated open-ended cone, a substantially cylindrical ring portion extending axially from the large end of said conical shell, said ring portion being provided with a longitudinally extending slot, a split clamp member disposed within and in circumferential engagement with said ring portion, said split clamp member being rigidly secured to said ring at a location remote from said slot, a pair of spaced ears extending from said split clamp member and outwardly through said slot, and means carried by said spaced ears to constrict said clamp member thereby to cause it to grip the support.

2. Bearing means constructed and arranged to mount pivotally, on a shaft-like support, an angularly movable member having a bearing seat, including a bearing element comprising a hollow seat-engaging shell having the shape of a truncated open-ended cone, a substantially plain cylindrical ring portion extending axially from the large end of said conical shell, said ring portion being provided with a longitudinally extending slot, a split circular clamp member disposed within and in circumferential engagement with said ring portion, said split clamp member being spot-welded to said ring at a location remote from said slot and having an inner diameter substantially equal to the inner diameter of the small end of said conical shell, a pair of spaced ears extending substantially radially from said split clamp member and outwardly through said slot, and means including a bolt carried by said spaced ears to constrict said split clamp member thereby to cause it to grip the support.

3. Bearing means constructed and arranged to mount pivotally, on a shaft-like support, an angularly movable member having a bearing seat, including a bearing element comprising a hollow seat-engaging shell having both its inner and outer surfaces in the shape of a truncated open-ended cone and having its inner portion adjacent its small end of a diameter substantially equal to that of the shaft-like support, a substantially plain cylindrical ring portion extending axially from the large end of said conical shell, said ring portion being provided with a longitudinally extending slot, a split circular clamp member disposed within and in circumferential engagement with said ring portion, said split clamp member being spot-welded to said ring at a location remote from said slot and having an inner diameter substantially equal to the inner diameter of the small end of said conical shell, a pair of spaced ears extending substantially radially from said split clamp member and outwardly through said slot, and means including a bolt carried by said spaced ears to constrict said split clamp member thereby to cause it to grip the support.

DANIEL H. CHASON.

REFERENCES CITED

The following references are of record in the file of this patent:

UNITED STATES PATENTS

| Number | Name | Date |
|---|---|---|
| 288,489 | Proctor | Nov. 13, 1883 |
| 328,088 | Tibbles | Oct. 13, 1885 |
| 388,927 | Stark | Sept. 4, 1883 |
| 996,301 | Vallette | June 27, 1911 |
| 1,275,439 | Johnson | Aug. 13, 1918 |
| 1,440,559 | Sharpe | Jan. 2, 1923 |
| 1,799,783 | Church | Apr. 7, 1931 |
| 2,136,819 | Large | Nov. 15, 1938 |
| 2,277,384 | Bowers | Mar. 24, 1942 |
| 2,362,160 | Robertson | Nov. 17, 1944 |
| 2,418,219 | Bley | Apr. 1, 1947 |

FOREIGN PATENTS

| Number | Country | Date |
|---|---|---|
| 538,377 | France | Mar. 17, 1922 |